A. N. RAUL & P. S. SPRINGER.
AUTOMOBILE SIGNAL.
APPLICATION FILED JULY 18, 1917.
1,301,741.
Patented Apr. 22, 1919.
2 SHEETS—SHEET 1.
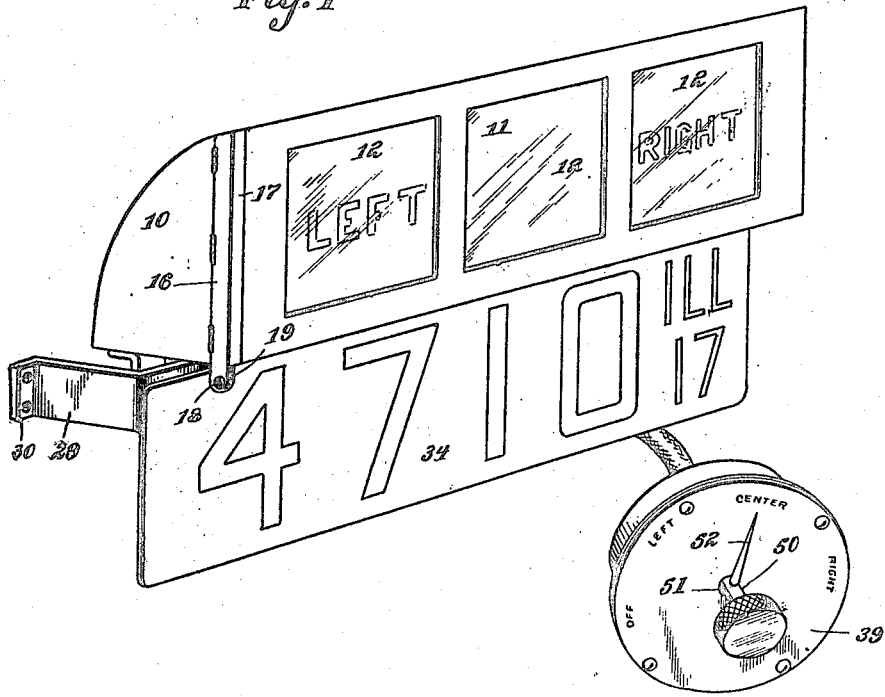
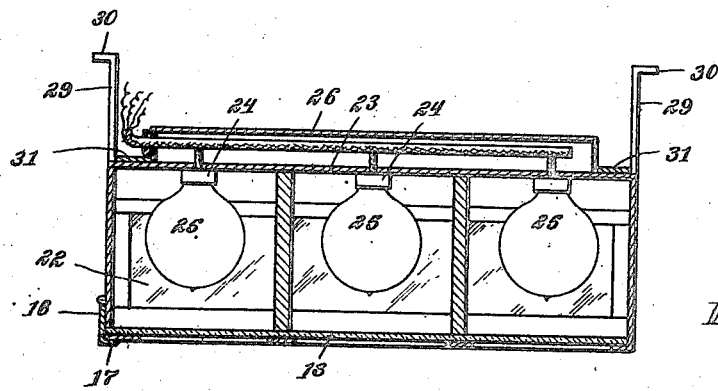

A. N. RAUL & P. S. SPRINGER.
AUTOMOBILE SIGNAL.
APPLICATION FILED JULY 18, 1917.
1,301,741.
Patented Apr. 22, 1919.
2 SHEETS—SHEET 2.
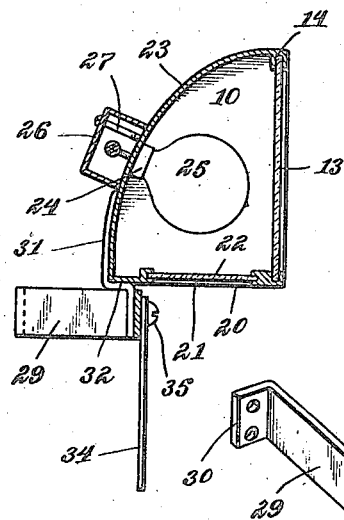
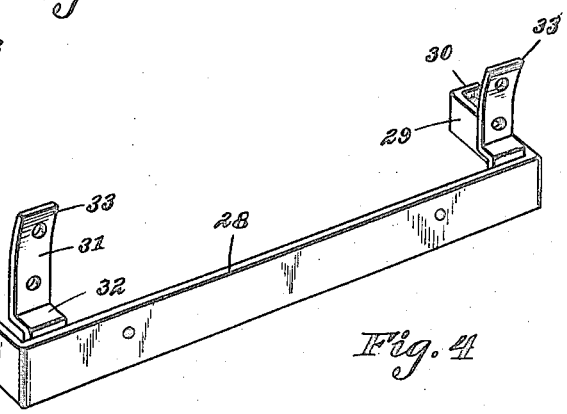
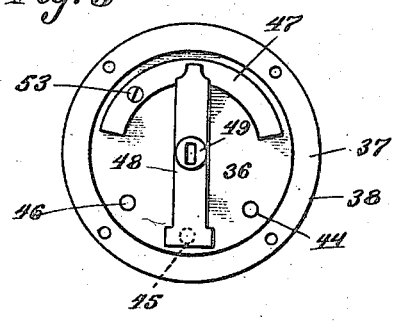
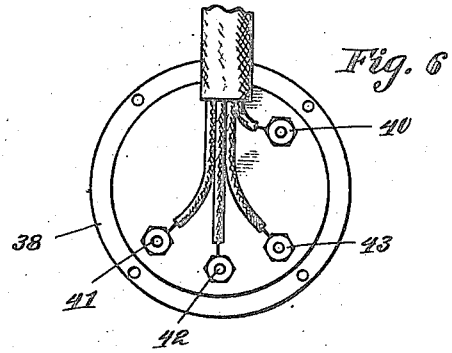
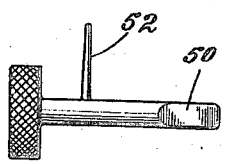
INVENTOR
A. N. Raul,
P. S. Springer,
BY Victor J. Evans
ATTORNEY
WITNESSES

UNITED STATES PATENT OFFICE.

ALOYSIUS N. RAUL AND PHILIP S. SPRINGER, OF CHICAGO, ILLINOIS.

AUTOMOBILE-SIGNAL.

1,301,741.
Specification of Letters Patent.
Patented Apr. 22, 1919.

Application filed July 13, 1917. Serial No. 181,347.

*To all whom it may concern:*

Be it known that we, ALOYSIUS N. RAUL and PHILIP S. SPRINGER, citizens of the United States, residing at Chicago, in the county of Cook and State of Illinois, have invented new and useful Improvements in Automobile-Signals, of which the following is a specification.

This invention relates to electric signal devices especially adapted for use on motor vehicles, to indicate to others the proposed direction of travel of the vehicle.

One of the objects of the invention is to provide an electric signal attached to a convenient part of the vehicle and operated by the driver, by means of a switch placed at a convenient point, as the instrument board or the steering post.

Another object of the invention is to provide a signal including a casing having electric signal lights therein, one side of said casing being provided with a removable transparent wall, by means of which access may be obtained to the interior of the casing, the wall containing certain indicia for indicating the proposed direction of travel of the vehicle, novel means being provided for retaining the removable wall in position.

Another object of the invention is the provision of a novel form of supporting bracket, by means of which the signal is secured to the vehicle, the said bracket also providing means for attaching the license tag in a position beneath the signal to receive the light of the signal lamps through the transparent bottom of the signal casing.

A further object is the provision of a novel form of operating switch by means of which the driver may conveniently operate the signal, the position of the switch key indicating the signal display. The switch further includes a novel form of removable key so that the said key may be removed from the switch when not in use, to prevent tampering with the signal by unauthorized persons.

With these and other objects in view, the invention consists of the following novel combination and arrangement of parts, hereinafter more fully described and illustrated in the accompanying drawings, in which—

Figure 1 is a perspective view of a combined signal device and license bracket, the said view also illustrating the signal operating switch.

Fig. 2 is a horizontal sectional view through the signal.

Fig. 3 is a cross-sectional view of the same.

Fig. 4 is a perspective view of the supporting bracket.

Fig. 5 is a front elevation of the switch with the face plate removed.

Fig. 6 is a rear elevation of the switch.

Fig. 7 is a detailed view of the switch key.

Referring to the drawings in detail, like characters of reference denote corresponding parts throughout the several views.

The invention in its practical form includes a signal device which embodies a casing 10, the said casing being of elongated form and having its front wall 11 formed with a plurality of preferably rectangular openings 12. These openings are normally closed by means of a slide 13, preferably formed of glass or other transparent material, the said slide entering ways 14 located upon the opposite sides of the openings 12 and being positioned within these ways through a slot 15 formed in one end of the casing 10. Hingedly secured to the casing adjacent the slot 15 is a door or closure 16, which is adapted to be folded over the slot and is provided with a flange 17 adapted to engage over the edge of the front wall of the casing. The closure 16 is further provided with an eye 18, which is adapted to be brought into convenient position with a similar eye 19 carried by the casing 10, in order that a suitable lock or other fastening device may be positioned therethrough to lock the closure 16 over the opening to prevent the unauthorized removal of the slide 13, so that the interior of the casing will be protected. The bottom wall 20 of the casing is provided with an opening 21, which is adapted to be closed by a glass or other transparent member 22 for a purpose hereinafter apparent.

The rear wall 23 of the casing is preferably rounded as shown and carries a plurality of lamp sockets 24, which project into the casing 10 and are adapted to receive signal lamps 25, preferably three in number, one of which is located directly within the rear of the front wall openings 12. The lamp sockets 24 are suitably wired upon the outside of the casing 10, the said sockets and wiring being protected by means of a supplemental casing 26, which is secured to the rear wall 22 by means of screws 27 or other suitable fastening devices.

The signal is adapted to be supported in any convenient place on the vehicle by means of a suitable supporting bracket, the said bracket including a longitudinally disposed U-shaped member, which comprises a front longitudinal bar 28 and rearwardly extending angularly disposed arms 29, each of which is provided with laterally extending feet 30 by means of which the U-shaped member is secured to the vehicle. Laterally and upwardly extending arms 31 are secured near each end of the longitudinal bar 28, the said arms being offset as at 32 to provide a seat for the casing 10, the arms terminating in curved extremities 33, which are secured to the rear wall 23 of the casing 10.

By reason of the offset portions 32 and the arms 31, the bar 28 is positioned along and within the rear longitudinal edge of the casing 10, so as to provide convenient means of attachment of the license tag 34, screws 35 being provided for this purpose. By so positioning the parts, the lamps 25 will cast their rays upon the license tag 34, so that the said lamps serve the dual purpose of lighting this tag and acting as signal lamps.

The transparent slide 13 is provided with suitable indicia at each end thereof, for example, at one end is the word "Right" to indicate when the lamp is lighted behind this word that the vehicle will turn to the right and at the other end is the word "Left" for the purpose of indicating the turning to the left when the signal lamp behind this word has been lighted, while the center space or opening 12 is utilized as the usual tail light signal for vehicles.

In order to properly control the signal, that is to selectively light and extinguish the various signal lamps 25, there is provided a switch 36, the said switch including a casing 37, which is preferably of circular form, having an annular flange 38 around its open face which is adapted to be closed by a face plate 39. Carried by the rear of the casing 37, which is formed out of suitable insulating material, are binding posts 40, 41, 42 and 43, the said posts 41, 42 and 43 being connected to suitable contact points 44, 45 and 46 respectively, while the binding post 40 is connected to an arcuate contact plate 47.

Pivotally mounted within the casing 37 is a movable contact member 48, which is adapted to bridge the space between any one of the contact points 44, 45 and 46 and the arcuate contact plate 48, so as to establish electrical connection between this plate and any of the points mentioned. A suitable contact element 48 is formed with the socket 49, which is adapted to be engaged by a key 50, which may be inserted through an opening 51 in the face plate 39 for the purpose of operating the switch.

The key 50 carries a pointer 52, which is movable over the face plate 39 and upon this face plate there is provided suitable indicia for coöperation with the pointer 52 for indicating the position of the movable contact element 48. For example, when the pointer is centrally positioned or pointing toward the word "Center", the movable contact element 48 bridges the space between the contact 46 and the plate 47. When the pointer 51 points to the word "Left" the element 48 bridges the space between the contact point 45 and the plate 47 and likewise, when the pointer 52 points toward the word "Right" the said element 48 bridges the space between the contact 44 and the plate 47, each of these contact points 44, 45 and 46 being connected respectively with the signal lamp indicated by the indicia provided upon the face plate 39. That is to say, that the contact point 44 is connected with the signal lamp which indicates "right", contact point 45 is connected with the signal lamp which indicates "left," while the contact point 46 is connected to the center or tail light. When the pointer 52 is pointed toward the word "Off", all of the lights are extinguished.

The binding post 40 is connected to a suitable source of electrical energy which is formed of suitable wiring, the said binding post extending through the casing 37 and connecting with the contact plate 47 as shown at 53.

It is thought that from the foregoing description when taken in connection with the accompanying drawings, the construction, operation and advantages of the invention will be clearly understood. The right is reserved to make such changes in the form and proportion thereof as will properly fall within the scope of the appended claim.

Having described the invention, what is claimed is:

A signal comprising a casing, signal lamps therein, a bracket including a longitudinally disposed U-shaped member adapted to be secured to the vehicle, laterally extending arms carried by said U-shaped member, said arms being offset to provide a seat for the signal casing and means for securing the license tag to said member, whereby the said tag will be positioned directly beneath and within the rear edge of the signal casing.

In testimony whereof we affix our signatures.

ALOYSIUS N. RAUL.
PHILIP S. SPRINGER.